US006612154B1

(12) United States Patent
Blumenthal et al.

(10) Patent No.: US 6,612,154 B1
(45) Date of Patent: Sep. 2, 2003

(54) SYSTEMS AND METHODS FOR MONITORING OR CONTROLLING THE RATIO OF HYDROGEN TO WATER VAPOR IN METAL HEAT TREATING ATMOSPHERES

(75) Inventors: Robert N. Blumenthal, Brookfield, WI (US); Andreas T. Melville, Brookfield, WI (US)

(73) Assignee: Furnace Control Corp., Milwaukee, WI (US)

( * ) Notice: Subject to any disclaimer, the term of this patent is extended or adjusted under 35 U.S.C. 154(b) by 0 days.

(21) Appl. No.: 09/218,390

(22) Filed: Dec. 22, 1998

(51) Int. Cl.[7] ................................................ G01N 7/16

(52) U.S. Cl. .................... 73/29.01; 73/29.05; 73/25.04; 73/25.05; 148/112; 148/121; 148/215; 148/508; 148/559

(58) Field of Search ............................ 73/29.01, 29.05, 73/25.01, 25.04, 25.05; 266/78, 87; 373/8; 431/18, 253; 432/36, 92; 148/112, 121, 215, 508, 559

(56) References Cited

U.S. PATENT DOCUMENTS 3,844,770 A * 10/1974 Nixon ......................... 75/529
3,920,447 A * 11/1975 Schroeder et al. ............ 266/87
4,158,166 A 6/1979 Isenberg
4,285,742 A * 8/1981 Bowes et al. ............... 148/278
4,288,062 A 9/1981 Gupta et al.
4,485,002 A 11/1984 Wunning
4,588,493 A 5/1986 Blumenthal et al. ........ 204/426
4,992,113 A 2/1991 Baldo et al.
5,137,616 A 8/1992 Poor et al. .................. 204/428
5,211,820 A 5/1993 Poor et al. .................. 204/426
5,231,645 A 7/1993 Uno et al.
5,352,344 A 10/1994 Gohring et al.
5,385,337 A 1/1995 Schultz
5,393,403 A 2/1995 Sasabe et al.
5,496,450 A 3/1996 Blumenthal et al. ........ 204/427
5,498,299 A 3/1996 Schmidt ..................... 148/210
5,556,556 A 9/1996 Blumenthal et al.
5,666,631 A 9/1997 Polizzotti et al.
5,772,428 A 6/1998 Van Den Sype et al. ... 148/634

OTHER PUBLICATIONS

Trade Brochure Furnace control Corp. "Lamination Annealing Control System" (Undated).

Chen, Yong Chwang, "Automatic Control Of The Carbon Potential of Furnace Atmospheres Without Adding Enriched Gas" Metallurgical Transactions B, Oct. 1993 vol. 24B, pp. 881–881–888.

Weissohn, Von K.H., *SauerstoffmeBzellen zum Regein von Ofenatmospharen*, warme Gas International, Band 21, Ocltober 10, 1983, pp. 436–437.

Weissohn, K.H., Oxygen partial pressure measurements with a zirconium oxide probe, warme Gas International, Jun. 6, 1980 pp. 331–342.

(List continued on next page.)

*Primary Examiner*—Daniel S. Larkin
(74) *Attorney, Agent, or Firm*—Ryan Kromholz & Manion, S.C.

(57) ABSTRACT

Systems and methods for monitoring a heat treating atmosphere derive from at least one sensor placed in situ in the atmosphere a process variable, which is indicative of the ratio of gaseous hydrogen $H_2(g)$ to water vapor $H_2O(g)$ in the atmosphere. The systems and methods use the process variable, e.g., to control the atmosphere, or to record, or display the process variable.

26 Claims, 6 Drawing Sheets

OTHER PUBLICATIONS

Sastri and Abraham, Atmosphere Control in Heat Treatment Furnaces Using Oxygen Probes, Tool & Alloy Steels, Apr. & May 1986 pp. 155–162.

Armson et al., Electrochemical Sensors for Heat Treatment Atmoshere Monitoring, CKN Group Technological Centre, Wolverhampton England pp. 905–918.

Controlled Atmos. annealing of steel using oxygen sensors to control and monitor atmosphere compan. Japanese Patent Abstract, JP 7988711 Dialog Search.

Annealing steel strip in furnace in which one oxygen sensor is used for controlling gas compsn. in combination with gas dew–point meter, Japanese patent Abstract, JP 56102518 Dialogue Search.

Oxygen sensor for annealing, Japanese Patent Abstract JP 60–9447.

Apparatus for oxygen analysis, Japanese patent Abstract, JP 91–330656.

Robert, Marc et al; Automatic prevention of decarburization through ALNAT FC processing pp. 75–78.

Robert, Marc Carbon flux method controls N2–hydrocarbon decarb/recarb Heat Treating/Sep. 1990 pp. 22–24.

Stanescu, Mircea Principal annealing atmospheres for steel rod and wire pp. 79–83.

Powers, Charles et al., Process Control for short Time Cycle Spheroidize Annealing.

"Ipsen unviels new sensor technology" Advanced Materials & Processes 10/98 pp. 128–129.

Ipsen International Inc.; Advanced Materials Processes 10/98 pp. 122–123.

Blumenthal, R.N. Control of Endothermic Generators–A Technical Comparison of Endothermic and Nitrogen/Methanol Carrier Atmosphere; ASM International, pp. 19–25 Copyright 1996.

ASM Handbook vol. 4 Heat Treating Circa 1998.

* cited by examiner

SYSTEMS AND METHODS FOR MONITORING OR CONTROLLING THE RATIO OF HYDROGEN TO WATER VAPOR IN METAL HEAT TREATING ATMOSPHERES

FIELD OF THE INVENTION

This invention relates generally to the monitoring and/or controlling of the ratio of hydrogen to water vapor in metal heat treating furnaces.

BACKGROUND OF THE INVENTION

In heat treating or thermal processing of metal and metal alloys, metal parts are exposed to specially formulated atmospheres in a heated furnace. Usually, the atmosphere contains the gaseous species hydrogen $H_2(g)$ and water vapor $H_2O(g)$. For example, the atmosphere can comprise a mixture of nitrogen $N_2$, hydrogen $H_2$, and water vapor (steam) $H_2O$. Alternatively, the atmosphere can comprise an exothermic-based atmosphere, generated by an external exothermic generator to contain a mixture of carbon monoxide CO, carbon dioxide $CO_2$, nitrogen $N_2$, hydrogen $H_2$, and water vapor $H_2O$.

The hydrogen to water vapor ratio in these atmospheres (in shorthand, called the $H_2/H_2O$ ratio) can affect the metal parts being processed and therefore should be monitored. The magnitude of the $H_2/H_2O$ ratio at a given temperature relates to the presence or absence of oxidation. More particularly, based upon thermodynamic considerations, oxidation of metal parts at a given temperature occurs when the $H_2/H_2O$ ratio of the atmosphere is lower than the $H_2/H_2O$ ratio at which equilibrium of the metal to its oxide at that temperature exists, which in shorthand will be called the equilibrium ratio.

The equilibrium ratio for a given metal at a given temperature for a given type of atmosphere can be approximated using, e.g., an Ellingham diagram (see Gaskell, *Introduction of Metallurgical Thermodynamics,* p. 287 (McGraw-Hill, 1981). The actual $H_2/H_2O$ ratio of the furnace atmosphere is usually determined by using remote gas analyzers. Remote gas analyzers individually measure percent hydrogen content and the dew point of the atmosphere, which is a measure of the water content. From these two measured quantities, the $H_2/H_2O$ ratio of the sampled furnace atmosphere can be ascertained by conventional methods.

Remote sensing of percent hydrogen content is accomplished using conventional thermal conductivity analyzers. These analyzers are generally well suited for sensing $H_2$ content in simple, binary gas atmospheres, containing a mixture of $H_2$ and $N_2$ gases. However, conventional thermal conductivity analyzers are not as well suited to sense $H_2$ content in more complex exothermic-based atmospheres, where carbon monoxide and carbon dioxide are also present with nitrogen.

In addition, the process of remote gas sensing can itself create significant sampling errors, which lead to erroneous readings. Remote gas sampling requires withdrawing atmosphere gas samples out of the furnace through gas sampling lines. The analysis is performed at ambient temperatures, and not at the temperature present in the furnace, so the sample must be cooled. These physical requirements for remote analysis introduce sampling errors, which are difficult to eliminate.

For example, error may arise due to leaks in the gas sampling line. Another error may also arise due to alteration of the gas chemistry caused either by soot formation during cooling (which is governed by the reaction: $CO+H_2=C+H_2O$), or by a water gas shift in the atmosphere (which is governed by the reaction: $H_2O+CO \rightarrow CO_2+H_2$), both of which alterations are a function of the sampling flow rate. Furthermore, in the case of high dew point atmospheres, condensation of water in the gas sampling lines can occur, leading to erroneous sensing results. All or some of these errors can occur at the same time.

The dew point of an exothermic-based atmosphere is usually measured when the atmosphere is produced by a separate external generator. However, this measured dew point does not relate to the dew point of the atmosphere once it enters the heated environment of the furnace itself. This is because, exothermic-based atmospheres are cooled to reduce their water content before introduction into a heated furnace environment. The cooling leaves the atmosphere in a non-equilibrium condition in reference to carbon dioxide $CO_2$ and water $H_2O$. When reheated to thermal processing temperatures inside the furnace, these gases react to reach equilibrium, generating water to prescribe a new dew point and percent carbon dioxide content, according to the reaction: $CO_2+H_2=CO+H_2O$.

For these reasons, there is a need for more direct and accurate systems and methods to ascertain the actual $H_2/H_2O$ ratio in atmospheres during the thermal processing of metals and metal alloys. There is also a need for systems and methods to apply the ascertained $H_2/H_2O$ ratio for control and for record keeping purposes.

SUMMARY OF THE INVENTION

One aspect of the invention provides systems and methods for monitoring a metal heat treating atmosphere by generating a computed $H_2/H_2O$ ratio for the atmosphere as a function of temperature and oxygen partial pressure $P_{O2}$.

In a preferred embodiment, the $P_{O2}$ is sensed in situ by a zirconia oxygen sensor. The temperature is likewise sensed by an in situ thermocouple. The in situ oxygen sensor and thermocouple are installed in the thermal processing furnace in direct contact with the gas atmosphere. This obviates sampling errors that are inherent in remote gas sampling techniques.

Another aspect of the invention provides systems and methods that make beneficial use of the computed $H_2/H_2O$ ratio. For example, the systems and methods control the thermal processing atmosphere based, at least in part, upon the computed $H_2/H_2O$ ratio, e.g., by controlling the mixture of gases in the atmosphere. As another example, the systems and methods record or display the computed $H_2/H_2O$ ratio, or both.

Another aspect of the invention provides systems and methods for monitoring a metal heat treating atmosphere by deriving from at least one sensor placed in situ in the atmosphere a process variable indicative of the $H_2/H_2O$ ratio. The systems and methods make use of the process variable, e.g., by displaying the computed $H_2/H_2O$ ratio, recording the $H_2/H_2O$ ratio, or by using the $H_2/H_2O$ ratio as a process variable to control the atmosphere.

Other features and advantages of the inventions are set forth in the following Description and Drawings, as well as in the appended Claims.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DESCRIPTION OF THE PREFERRED EMBODIMENTS

Figure 1:
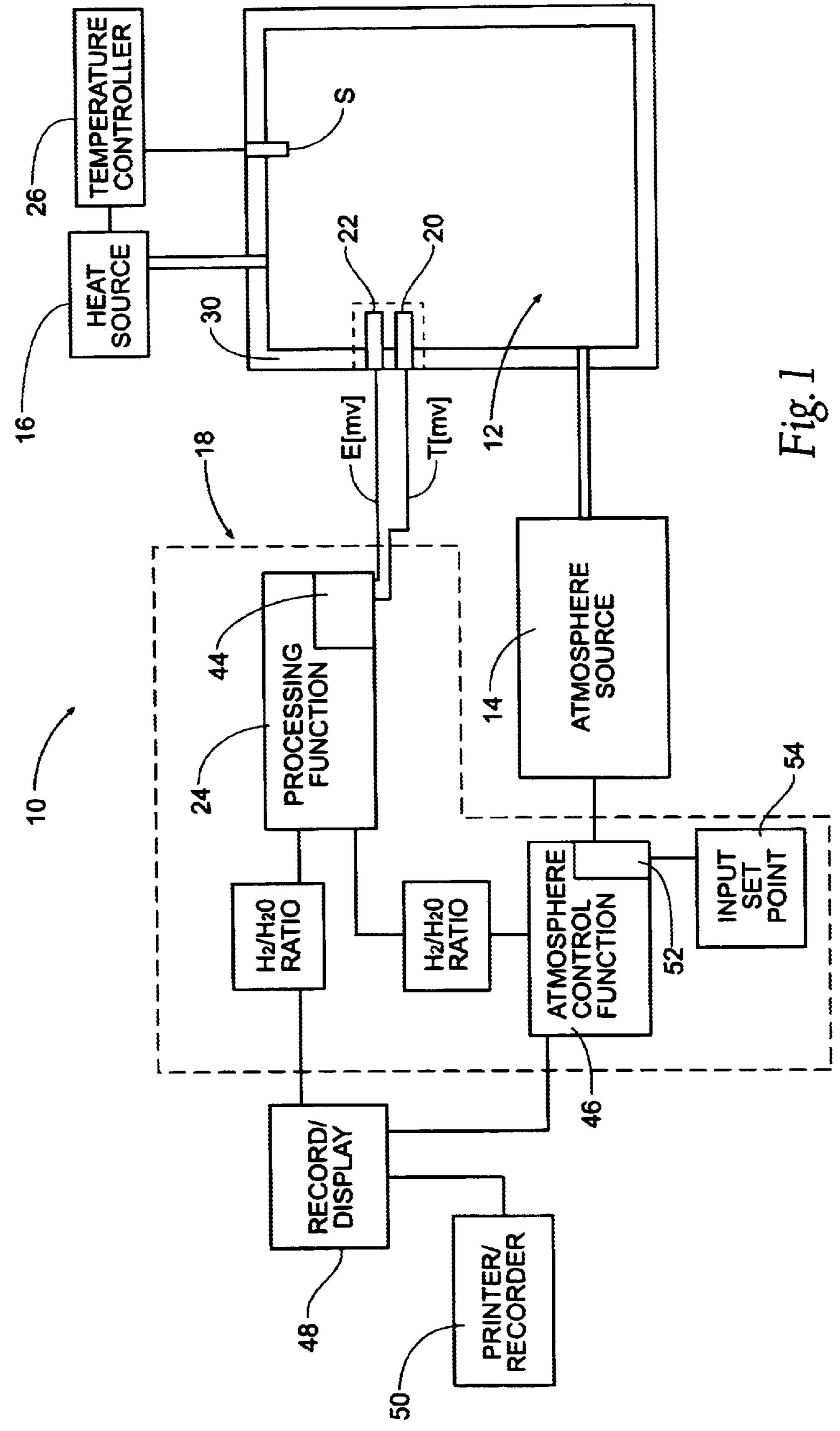
FIG. 1 is a schematic view of a system for heat treating metal, which includes a processing module for deriving a $H_2/H_2O$ ratio as a function of in situ temperature and a voltage signal from an in situ oxygen sensor.

I. Systems and Methods for In Situ Monitoring and Control of the $H_2/H_2O$ Ratio FIG. 1 shows a system 10 for heat treating metal and metal alloys. The system 10 includes a furnace 12, in which the metal or metal alloys are heat treated, i.e., thermally processed. FIG. 1 schematically shows the furnace 12 for the purpose of illustration, as the details of its construction are not material to the invention. Representative examples of specific types of furnaces will be described later.

The furnace 12 includes a source 14 of a desired atmosphere, which is conveyed into the furnace 12. The contents of the atmosphere are selected to achieve the desired processing objectives. One important objective is the monitoring or control of the $H_2/H_2O$ ratio, e.g., either to prevent oxidation or to cause an oxide to form.

The furnace 12 also includes a source 16 of heat for the furnace 12. The source 16 heats the interior of the furnace 12, and thus the atmosphere itself, to achieve the temperature conditions required to create the desired thermal reactions. Representative temperature conditions will be described in detail later. A temperature sensor S, e.g., a thermocouple, is electrically coupled to a furnace temperature controller 26, which is itself coupled to the heat source 16. The furnace temperature controller 26 compares the temperature sensed by the sensor S to a desired value set by the operator (using, e.g., an input device 54). The furnace temperature controller 26 generates command signals based upon the comparison to adjust the amount of heat provided by the source 16 to the furnace 12, to thereby maintain the desired temperature.

The system 10 includes a processor 18 for monitoring or controlling the $H_2/H_2O$ ratio of the atmosphere at the temperature maintained in the furnace 12. According to one aspect of the invention, the processor 18 includes no remote gas analyzers. Instead, the processor 18 includes only an in situ temperature sensor 20 and an in situ oxygen sensor 22. The processor 18 also includes a microprocessor controlled processing function 24, which is electrically coupled to the temperature and oxygen sensors 20 and 22.

Figure 2:
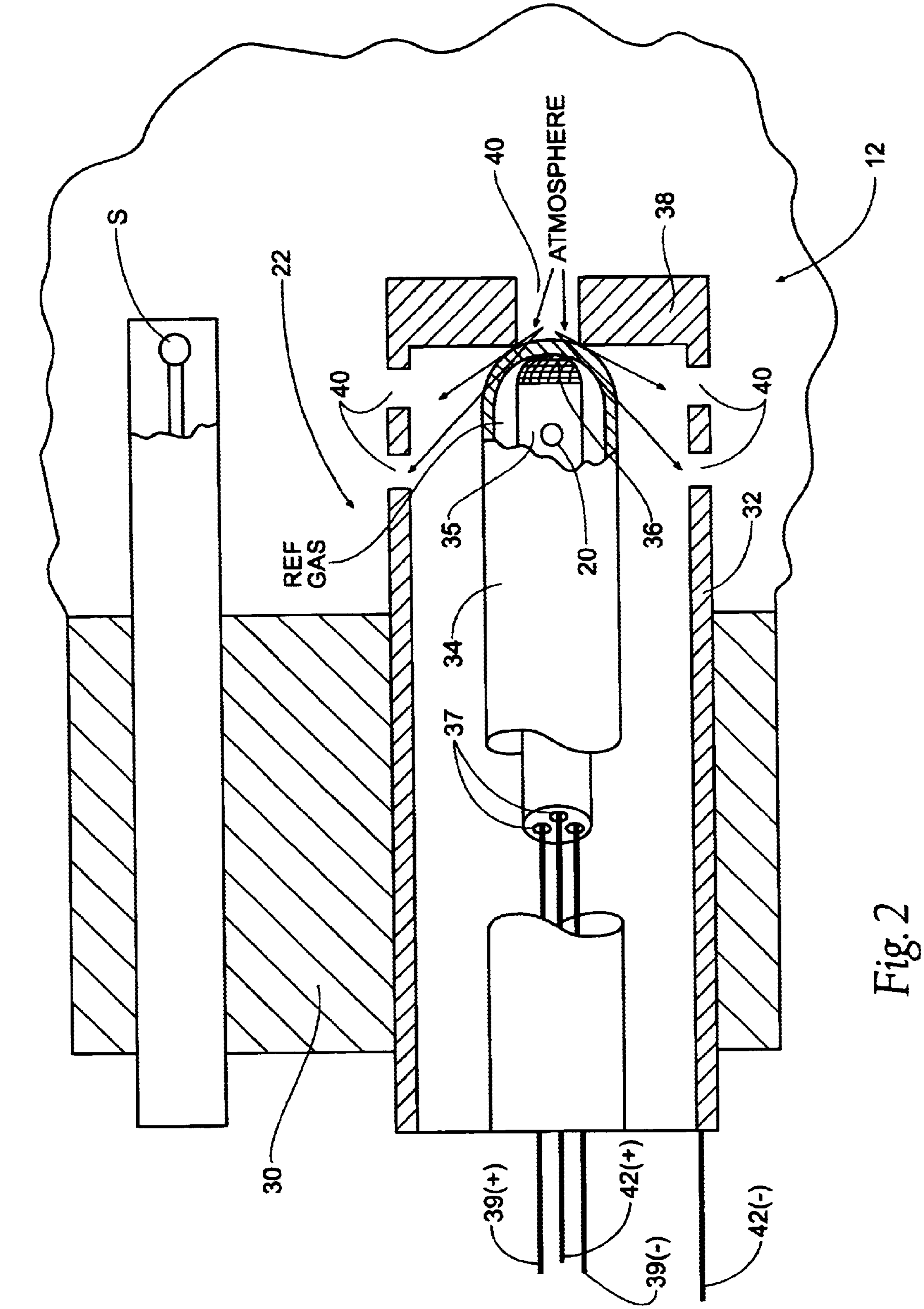
FIG. 2 is a side view, with portions broken away and in section, exemplifying one of the types of in situ temperature and oxygen sensors, which can be coupled to the processing module shown in FIG. 1.

The oxygen sensor 22 can be variously constructed. In FIG. 2, the oxygen sensor 22 is of the type described in U.S. Pat. No. 4,588,493 ("the '493 patent"), entitled "Hot Gas Measuring Probe." The '493 patent is incorporated into this Specification by reference.

The oxygen sensor 22 is installed through the wall 30 in the furnace 12. The oxygen sensor 22 is thereby exposed to the same temperature and the same atmosphere as the metal parts undergoing processing.

As FIG. 2 shows, the oxygen sensor 22 includes an outer sheath 32, which, in the illustrated embodiment, is made of an electrically conductive material. Alternatively, the sheath 32 could be made of an electrically non-conductive material.

The sheath 32 encloses within it an electrode assembly. The electrode assembly comprises a solid, zirconia electrolyte 34, formed as a hollow tube, and two electrodes 36 and 38.

The first (or inner) electrode 36 is placed in contact with the inside of the electrolyte tube 34. A reference gas occupies the region where the inside of the electrolyte 34 contacts the first electrode 36. The oxygen content of the reference gas is known.

The second (or outer) electrode 38, which also serves as an end plate of the sheath 32, is placed in contact with the outside of the electrolyte tube 34. The furnace atmosphere circulates in the region where the outside of the electrolyte 34 contacts the second electrode 38. The furnace atmosphere circulates past the point of contact through adjacent apertures 40.

A voltage E (measured in millivolts) is generated between the two sides of the electrolyte 34. The voltage-conducting lead wires 42(+) and 42(−) are coupled to the processing function 24. Alternatively, when an electrically non-conductive sheath 32 is used, internal lead wires (not shown) are coupled to the second electrode 38 to conduct the voltage E to the processing module 24.

Other types and constructions for the oxygen sensor 22 can be used. For example, the oxygen sensor 22 can be of the type shown in U.S. Pat. No. 4,101,404. Commercial oxygen sensors can be used, e.g., the CARBONSEER™ or ULTRA PROBE™ sensors sold by Marathon Monitors, Inc., or ACCUCARB® sensors sold by Furnace Control Corporation. Some oxygen sensors are better suited for use in higher temperature processing conditions, while other oxygen sensors are better suited for lower temperature processing conditions.

In the illustrated embodiment, the temperature sensor 20 takes the form of a thermocouple. Preferably, the temperature sensor 20 is carried within the electrolyte tube 34, e.g., by a ceramic rod 35. In this arrangement, the ceramic rod 35 includes open interior bores 37, through which the reference gas is introduced into the interior of the electrolyte tube 34, The lead wire 42(+) for the oxygen sensor 22 passes through one of the bores 37, and the other lead wire 42(−) for the oxygen sensor 22 is coupled to the sheath 32. The lead wires 39(+) and 39(−) for the thermocouple sensor 20 pass through the other bores 37, to conduct the thermocouple voltage outputs to the processing module 24.

By virtue of this construction, the temperature sensor 20 is exposed to the same temperature conditions as the furnace atmosphere circulating past the point of contact of the electrolyte 34 and electrodes 36 and 38. This is also essentially the same temperature condition as the metal parts undergoing treatment.

Alternatively, the temperature sensor 20 can comprise a separate sensor, which is not an integrated part of the oxygen sensor 22. The thermocouple S, used in association with the heat source 16, can also be used to sense temperature conditions for use in association with the oxygen sensor 22.

The magnitude of the voltage E(mv) generated by the oxygen sensor 22 is a function of the temperature (sensed by the temperature sensor 20) and the difference between the partial pressure of oxygen in the furnace atmosphere and the partial pressure of oxygen in the reference gas. The voltage E(mv) can be expressed as follows:

$$E(mv) = 0.0496T \times \log\frac{P_{O2}(Ref)}{P_{O2}} \quad (1)$$

where:

T is the temperature sensed by the temperature sensor(in degrees Kelvin °K).

$P_{O2}$ (Ref) is the known partial pressure of oxygen in the reference gas, which in the illustrated embodiment is air at 0.209 atm. Other reference gases can be used.

$P_{O2}$ is the partial pressure of oxygen in the furnace atmosphere.

The magnitude of $P_{O2}$(Ref) is known. The quantity $P_{O2}$ can thereby be ascertained as a function of T (which the in situ temperature sensor 20 provides) and E (which the in situ oxygen sensor 22 provides).

The expression of $P_{O2}$ derived from in situ outputs of E and T can be reexpressed as a new expression of the $H_2/H_2O$ ratio of the atmosphere.

More particularly, at a given temperature under equilibrium conditions, the partial pressure of oxygen $P_{O2}$ is related to the reaction upon which the $H_2/H_2O$ ratio is based, as follows:

$$H_2(g)+½O_2(g)=H_2O(g) \quad (2)$$

The thermodynamic equilibrium constant $K_2$ for Equation (2) is given by the following expression:

$$K_2 = \frac{P_{H_2O}}{P_{H_2}P_{O_2}^{1/2}} \quad (3)$$

where:

$P_{H2O}$ is the partial pressure of water.

$P_{H2}$ is the partial pressure of hydrogen.

The thermodynamic equilibrium constant $K_2$ can also be expressed exponentially as:

$$K_2=\exp^{-\Delta G_2°/RT} \quad (4)$$

where:

$\Delta G_2°$ is the standard free energy equation for Equation (2).

R is the gas content of the atmosphere.

T is the temperature of the atmosphere in degrees Kelvin.

By combining Equations 1, 3, 4, and the thermodynamic expression for $\Delta G_2°$, an expression for the ratio $P_{H2}/P_{H2O}$ as a function of E and T is obtained, as follows:

$$P_{H_2}/P_{H_2O}=10^{[(10.081E-12,880.1)/(T°K)+3.2044]} \quad (5)$$

where:

E is the millivolt output of the in situ oxygen sensor 22.

T°K is the temperature sensed by the in situ temperature sensor 20 (in degrees Kelvin).

The processing function 24 includes a resident algorithm 44. The algorithm 44 computes $P_{H2}/P_{H2O}$ as a function of E and T, according to Equation (5).

To supply the input variables E and T to the algorithm 44, the processing function 24 is electrically coupled to the lead wires 42(+) and 42(−) of the oxygen sensor 22 and the lead wires 39(+) and 39(−) of the temperature sensor 20. The electrical inputs E and T are supplied to the algorithm 44, which provides, as an output, the quantity $P_{H2}/P_{H2O}$ as a function of E and T, according to Equation (5). The output expresses the magnitude of the $H_2/H_2O$ ratio.

Unlike prior systems, the system 10 requires no measurement of the hydrogen content or dew point by remote sensing at ambient temperatures to derive the $H_2/H_2O$ ratio. The system 10 can thereby be free of remote sensors. The system 10 relies solely upon in situ sensing to derive the $H_2/H_2O$ ratio. The system 10 thereby eliminates errors associated with remote gas sensing, as previously described.

The processing function 24 outputs the calculated $H_2/H_2O$ ratio for further uses by the system 10. The $H_2/H_2O$ ratio output can, e.g., be displayed, or recorded over time, or used for control purposes, or any combination of these processing uses.

For example, in FIG. 1, the system 10 includes a display device 48 coupled to the processing function 24. The display device 48 presents the derived $H_2/H_2O$ ratio for viewing by the operator. The display device 48 can, of course, show other desired atmosphere or processing information. Alternatively, or in combination, a printer or recorder 50 can be coupled to the processing function 24 for showing the derived the $H_2/H_2O$ ratio and its fluctuation over time in a printed strip chart format.

In a preferred embodiment, the processor 18 further includes an atmosphere control function 46. The atmosphere control function 46 includes a comparator function 52. The comparator function 52 compares the derived $H_2/H_2O$ ratio to a desired control value or set point, which the operator can supply using, e.g., an input 54. Based upon the deviation between the derived $H_2/H_2O$ ratio and the set point, the atmosphere control function 46 generates a control signal to the atmosphere source 14. The control function 46 generates signals, to adjust the atmosphere to establish and maintain the derived $H_2/H_2O$ ratio at or near the set point. The control function 46 is also coupled to the device 48 to show other atmosphere or processing information. In this way, the processor 18 works to maintain atmosphere conditions optimal for the desired processing conditions.

The system 10 can take various forms. The following description presents an illustrative arrangement and use of the system 10 for the purpose of controlling processing conducted for the purpose of annealing steel laminations, e.g., laminations contained in electric motors.

II. Monitoring and Control of Atmospheres for Annealing Steel Laminations

Figure 3:
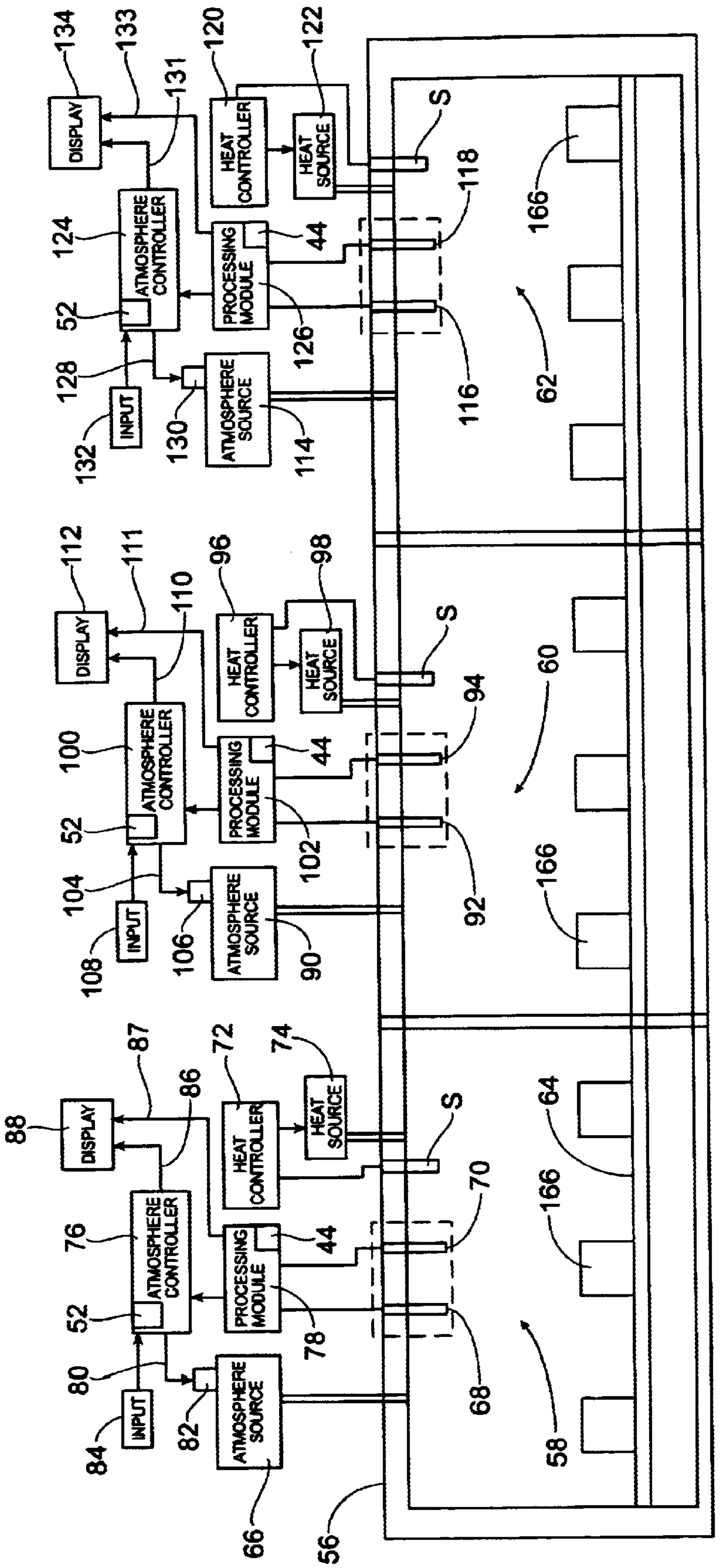
FIG. 3 is a schematic view of a furnace for annealing electric motor laminations, which is controlled by one or more processing modules as shown in FIG. 1.

FIG. 3 shows in schematic form a furnace 56 specially configured for annealing steel laminations used in electric motors. FIG. 3 generally shows these laminations as work 166.

The furnace establishes three different processing conditions 58, 60, and 62. The first condition 58 is for annealing. The second condition 60 is for cooling prior to blueing. The third condition 62 is for blueing after cooling. Each processing condition 58, 60, and 62 serves a different purpose. Therefore, each condition 58, 60, and 62 requires a different atmosphere and temperature environment.

The furnace 56 can be variously constructed. The furnace 56 can, e.g., comprise a batch furnace, such as a bell-type furnace, a box furnace, or a pit furnace. In this arrangement, different atmosphere and temperature conditions are cyclically established in a single furnace chamber.

Alternatively, the furnace 56 can comprise a continuous furnace of a roller hearth, pusher, or mesh belt construction. In this arrangement, the furnace is compartmentalized into two or more processing chambers. The atmosphere and temperature conditions are controlled in the chambers to establish the conditions 58,60, and 62.

FIG. 3 typifies a continuous furnace arrangement, wherein the conditions are established in three sequential zones 58, 60, and 62. The work 166 is transferred from one zone to another by a suitable work transport mechanism 64, like a mesh belt or rollers, for processing.

FIG. 3 is meant to show a typical continuous furnace in simplified, schematic form, without all the structural detail which is known by those skilled in heat processing. For example, the furnace 56 may also include burnout and gas purge regions before the first zone 58. Also, the first and second zones 58 and 60 may coexist at opposite ends of a single chamber, which may, in turn, be separated by an additional gas purge region from the third zone 62, which occupies its own distinct chamber. There are many different types of possible furnace configurations. Understanding or practicing the invention do not depend upon and are not limited by such structural details.

A. The Annealing Zone

In the annealing zone 58, high temperature conditions are maintained, e.g., 1400° F. to 1550° F. A temperature sensor S is coupled to a temperature controller 72 for the annealing zone 58. The temperature controller 72 is coupled to a source 74 of heat for the zone 58. Based upon temperature signals received from the temperature sensor S, the controller 72 operates the heat source 74 to maintain the zone 58 at the desired temperature.

Further, a source 66 supplies an atmosphere to the annealing zone 58 of the furnace 56. The atmosphere is established and maintained to serve two purposes.

As a first purpose, the atmosphere provides a reducing atmosphere, which prevents oxidation of iron present in the steel laminations. In addition, the atmosphere minimizes internal oxidation of more active elements, like silicon and aluminum, present in the steel laminations. A reducing atmosphere is characterized by the presence of hydrogen $H_2$ and water $H_2O$ in sufficient proportions, given the temperature, to reduce the presence of iron oxide. The presence of a reducing atmosphere in the annealing zone 58 prevents the formation of iron oxide on the surface of the steel laminations and minimize internal oxidation within the steel laminations.

As a second purpose, the atmosphere in the annealing zone 58 provides a decarburizing atmosphere. A decarburizing atmosphere removes carbon from the laminations. This is important to improve the magnetic properties of steel. More specifically, carbon causes aging and magnetic core losses in the laminations.

The decarburizing reaction desired in the annealing zone 58 is given by the following reaction:

$$\underline{C}+H_2O=CO+H_2 \quad (6)$$

where $\underline{C}$ represents the carbon in solution in the ferrite structure of iron.

$H_2O$ is water vapor.

CO is carbon monoxide.

$H_2$ is hydrogen.

The source 66 can generate the atmosphere for the annealing zone 58 in various ways.

For example, the source 66 can provide a mixture of nitrogen $N_2$ and hydrogen $H_2$ (which will be in shorthand called a "$N_2$+$H_2$ atmosphere"). The $N_2$+$H_2$ atmosphere is inherently free or essentially free of water vapor.

Alternatively, the source 66 can provide an exothermic-based atmosphere. This atmosphere is produced by mixing air with a fuel, like natural gas or propane, in an external apparatus, as before described. This atmosphere includes, in addition to nitrogen $N_2$ and hydrogen $H_2$, carbon monoxide CO, carbon dioxide $CO_2$, and water vapor.

Based upon Equation (6) and kinetic considerations, for a given atmosphere and temperature, the rate of removal of carbon (i.e., decarburization) is proportional to the partial pressure of water $P_{H2O}$ in the atmosphere. At a given temperature, increasing the dew point of the atmosphere (by increasing the water vapor content) increases the rate of decarburization. However, increasing the water vapor content without proportionally increasing the hydrogen $H_2$ content will decrease the $H_2/H_2O$ ratio, causing oxide formation. A balance must therefore be struck between decarburization and oxidation.

In the $N_2$+$H_2$ atmosphere, the water vapor content is inherently very low. Steam is added to increase the water vapor content and change the dew point. For a given temperature, as steam is added to the atmosphere, the dew point increases and, with it, the rate of decarburization.

In an exothermic-based atmosphere, the magnitude of the inherent water vapor content is affected by the air-to-fuel ratio. At a given temperature, the introduction of more air, to raise the air-to-fuel ratio, increases the water vapor content and dew point, and vice versa. With these increases, the rate of decarburization increases, as well.

In the annealing zone 58, in addition to the need for decarburization, the $H_2/H_2O$ ratio must be kept high enough to provide a reducing atmosphere, to prevent oxidation of iron and minimize internal oxidation of the more active elements in the laminations. Increasing the water vapor content of the atmosphere to increase decarburization, without proportional increases in the hydrogen $H_2$ content of the atmosphere, decreases the $H_2/H_2O$ ratio, driving the atmosphere toward an undesirable oxidizing condition.

In the $N_2$+$H_2$ atmosphere, the amount of hydrogen is usually kept at a generally constant magnitude. The constant amount of hydrogen limits the maximum dew point that can be obtained at a given atmosphere.

In an exothermic-based atmosphere, increases in water vapor content are accompanied by decreases in the hydrogen $H_2$ content.

In either situation, the optimum range of $H_2/H_2O$ ratios to prevent oxidation, yet be as decarburizing as possible at a given temperature, is constrained. For this reason, the accurate measurement and control of the $H_2/H_2O$ ratio is critical to assure desired results.

According to the invention, an in situ oxygen sensor 68 and temperature sensor 70 are placed in the annealing zone 58 of the furnace. The sensors 68 and 70 are preferably part of an integrated assembly, as FIG. 2 shows. For example, an ACCUCARB® Oxygen Sensor, Model AQ620-S-1 (Furnace Control Corporation) can be used, as it is well suited for use in high temperature conditions.

Both the oxygen and temperature sensors 68 and 70 are further coupled to a processing module 78 for the annealing zone 58. The resident algorithm 44, already described, is installed in the processing module 78.

An output of the processing module 78 is coupled to an atmosphere controller 76. An output 80 of the controller 76 is, in turn, coupled to a controllable valve 82, which is operatively coupled to the atmosphere source 66 for the annealing zone 58.

For a nitrogen-based atmosphere, the valve 82 controls the rate at which steam is introduced into the nitrogen-based atmosphere. In an exothermic-based atmosphere, the valve 82 controls the air-to-fuel ratio of the atmosphere. In both arrangements, operation of the valve 82 affects the water vapor content of the atmosphere in the annealing zone 58.

A desired set point $H_2/H_2O$ ratio for the annealing zone 58 is entered into the atmosphere controller 76 by the operator through an input 84. The desired set point $H_2/H_2O$ ratio is selected to maintain a desired reducing atmosphere condition at the processing temperature maintained in the annealing zone 58.

The processing module 78 receives the electrical E(mv) signal from the oxygen sensor 68 and T(mv) signal from the temperature sensor 70 residing in the annealing zone 58. Based upon these inputs, the algorithm 44 of the processing module 78 derives as an output the $H_2/H_2O$ ratio. This output is conveyed to the atmosphere controller 76.

The atmosphere controller 76 also includes the comparator function 52, as before described. The comparator function 52 compares the derived $H_2/H_2O$ ratio to the set point. The comparator function 52 preferably conducts a conventional proportional-integral-derivative (PID) analysis. The PID analysis takes into account the difference between the derived magnitude and the set point, and also integrates the difference over time. Based upon this analysis, the atmosphere controller 76 derives a deviation, which is converted to a control output. The controller 76 conveys the control output to the valve 82, based upon the magnitude of the deviation, to keep the deviation at or near zero.

When the deviation indicates that the derived $H_2/H_2O$ ratio exceeds the set point, the controller 76 operates the valve 82 to lower the magnitude of the $H_2/H_2O$ ratio in the atmosphere in the annealing zone 58, i.e., by increasing the water vapor content. In the $N_2+H_2$ atmosphere, the valve 82 increases the flow rate of steam into the atmosphere of the annealing zone 58. In an exothermic-based atmosphere, the valve 82 increases the air-to-fuel ratio of the external generator.

When the deviation indicates that the derived $H_2/H_2O$ ratio for the annealing zone 58 is lower than the set point, the controller 76 operates the valve 82 to raise the magnitude of the $H_2/H_2O$ ratio in the annealing zone 58, i.e., by decreasing the water vapor content. In the $N_2+H_2$ atmosphere, the valve 82 decreases the flow rate of steam into the atmosphere of the annealing zone 58. In an exothermic-based atmosphere, the valve 82 decreases the air-to-fuel ratio of the external generator.

It should be appreciated that other corrective action can be taken based upon the deviation. The foregoing description is intended to exemplify one type of corrective action.

In this way, the processing module 78 provides a process variable indicative of the $H_2/H_2O$ ratio in the annealing zone 58, based solely upon in situ sensing by the temperature sensor 70 and the oxygen sensor 68, to control the atmosphere in the annealing zone 58. The in situ sensing reflects the actual $H_2/H_2O$ ratio of the atmosphere within the furnace, and eliminates the errors of remote sensing.

An output 86 of the controller 76 and an output 87 of the processing module 78 are coupled to a device 88 that displays, or records, or stores in memory the calculated $H_2/H_2O$ ratio and other operating conditions in the annealing zone 58 on a real time basis. Details of a preferred display will be described later.

B. The Cooling Zone

The work 166 (i.e, the laminations) is carried by the transfer mechanism 64 from the annealing zone 58 into the cooling zone 60. The cooling zone 60 establishes a region where gradient cooling can occur between the high temperature of the annealing zone 58 and the lower temperature of the blueing zone 62.

In the cooling zone 60, the temperature is typically under 1000° F., which corresponds to the lowest temperature that wustite (FeO) is stable and therefore will not form on the work 166. The purpose of the zone 60 is to allow the laminations to gradually cool before entering the blueing zone 62, to thereby prevent stress to the annealed laminations without wustite formation.

The temperature gradient can be established in various ways. For example, as FIG. 3 shows, a temperature sensor S can be coupled to a temperature controller 96 for the cooling zone 60, to operate a heat source 98 to maintain a desired temperature gradient in the zone 60. Alternatively, the cooling zone 60 may not be directly heated, thereby establishing a region where gradient cooling can occur between the annealing zone 58 and the blueing zone 62.

The cooling zone 60 may comprise a separate chamber in the furnace 56 physically separated from the annealing zone 58 and/or the blueing zone 62. Typically, however, the annealing zone 58 and the cooling zone 60 share opposite ends of a common chamber within the furnace 56.

In this arrangement, when a $N_2+H_2$ atmosphere with added steam is supplied to the annealing zone 58 by the source 66, the cooling zone 60 can itself be served by a separate source 90, which supplies a $N_2+H_2$ atmosphere, but without added steam. This provides a reducing atmosphere to prevent oxidation of the iron and minimize internal oxidation of the more active elements like silicon and aluminum in the laminations, as they cool.

Alternatively, in this arrangement and when an exothermic-based atmosphere is supplied by the source 66 to the annealing zone 58, no separate source 90 of atmosphere communicates with the cooling zone 60. In this arrangement, the exothermic-based atmosphere present in the annealing zone 58 flows into the cooling zone 60. This also provides a reducing atmosphere to prevent oxidation of the iron and minimize internal oxidation of the more active elements like silicon and aluminum in the laminations, as they cool.

In either situation, an in situ oxygen sensor 92 and a temperature sensor 94 are preferably placed in the cooling zone 60 of the furnace 56. The sensors 92 and 94 are preferably part of an integrated assembly, as FIG. 2 shows. For example, an ACCUCARB® Oxygen Sensor OXA20-S-0 (Furnace Control Corporation) can be used, as it is well suited for use in lower temperature conditions. The oxygen and temperature sensors 92 and 94 are coupled to a processing module 102 for the cooling zone 60.

The processing module 102 includes the resident algorithm 44, already described, to generate the $H_2/H_2O$ ratio output. An output 111 of the module 102 is coupled to a device 112 that displays, or records, or stores in memory the computed $H_2/H_2O$ ratio for the cooling zone 60 on a real time basis. In this way, the sensors 92 and 94 monitor the $H_2/H_2O$ ratio in the cooling zone 60.

When the separate source 90 supplies a $N_2+H_2$ atmosphere to the cooling zone 60 (or when the atmosphere in the cooling zone 60 can otherwise be separately controlled, e.g. by providing a segregated cooling zone 60), the $H_2/H_2O$ ratio of the processing module 102 is conveyed to an atmosphere controller 100. An output 104 of the controller 100 is, in turn, coupled to a control valve 106. The control valve 106 controls the source 90 to directly provide an atmosphere in the cooling zone 60 to achieve a desired $H_2/H_2O$ ratio.

In this arrangement, a desired set point $H_2/H_2O$ ratio for the cooling zone 60 is entered into the atmosphere controller 100 by the operator through an input 108. The desired set point $H_2/H_2O$ ratio is selected to maintain a desired reducing atmosphere condition at the temperature maintained in the cooling zone 60. As the equilibrium $H_2/H_2O$ ratio for a given reducing atmosphere increases with decreases of temperature, the set point $H_2/H_2O$ ratio is likewise increased in the cooling zone 60, as compared to the set point of the annealing zone 58.

In this arrangement, the atmosphere controller 100 for the cooling zone 60 operates in the same fashion as the atmosphere controller 76 for the annealing zone 58. Based upon the electrical E(mv) signal from the oxygen sensor 92 and T(mv) signal from the temperature sensor 94, the processing module 102 derives the $H_2/H_2O$ ratio of the atmosphere in the cooling zone 60 according to the resident algorithm 44. The $H_2/H_2O$ ratio is conveyed to the atmosphere controller 100, where the resident comparator function 52 compares the derived $H_2/H_2O$ ratio to the set point to generate a deviation. The atmosphere controller 100 generates a control output to the valve 106 based upon the deviation, to keep the deviation at or near zero. In this way, the controller 100 maintains the $H_2/H_2O$ ratio of the atmosphere of the cooling zone 60 at or near the set point. An output 110 of the atmosphere controller 100 can also be coupled to the display device 112, to show various processing conditions.

When an exothermic-based atmosphere is present in the cooling zone 60, or when there is otherwise no separate controllable atmosphere source 90 for the zone 60, indirect control of the $H_2/H_2O$ ratio in the cooling zone 60 can be achieved by monitoring of the $H_2/H_2O$ ratio by the sensors 92 and 94. For example, the set point $H_2/H_2O$ ratio for the annealing zone 58 can be adjusted, based upon the monitored computed $H_2/H_2O$ ratio for the cooling zone 60, to obtain a balance of oxidation-free conditions in both annealing and cooling zones 58 and 60.

In either way, the processing module 102 provides a monitored $H_2/H_2O$ ratio and/or a process variable for the cooling zone 60, indicative of the $H_2/H_2O$ ratio, based solely upon in situ sensing by the temperature sensor 94 and the oxygen sensor 92.

C. The Blueing Zone

The transfer mechanism 64 carries the work 166 (i.e., the laminations) from the cooling zone 60 and into the blueing zone 62. The work 166 has, by now, cooled to below the temperature at which wustite (FeO) can form. If needed, a temperature sensor S can be coupled to a temperature controller 120 for the blueing zone 62, to operate a heat source 122 to maintain the zone 62 at the desired temperature.

A source 114 supplies an atmosphere into the blueing zone 62. Unlike the annealing and cooling zone 58 and 60, the atmosphere introduced into the blueing zone 62 purposely provides an oxidizing atmosphere. The oxidizing atmosphere produces desired forms of iron oxide on the surface of the laminations. Still, the temperature of the blueing zone 62 prevents the formation of wustite (FeO) in the oxidizing atmosphere of the blueing zone 62, which is highly undesired.

In the illustrated embodiment, the source 114 supplies steam to the blueing zone 62 to provide the oxidizing atmosphere. Alternatively, an exothermic-based atmosphere with water vapor content can be used.

As in the annealing and cooling zones 58 and 60, an in situ oxygen sensor 116 and temperature sensor 118 are placed in the blueing zone 62 of the furnace 56. The sensors 116 and 118 are preferably part of an integrated assembly, as FIG. 2 shows. For example, an ACCUCARB® Oxygen Sensor OXA20-S-0 (Furnace Control Corporation) can be used, as it is well suited for use in the lower temperature conditions of the blueing zone 62 (e.g., 800° F. to 1000° F.).

The oxygen and temperature sensors 116 and 118 are likewise coupled to a processing module 126 for the cooling zone 62. The processing module 126 includes the resident algorithm 44 already described. An output 133 of the processing module 126 is coupled to a device 134 that displays, or records, or stores in memory the $H_2/H_2O$ ratio for the blueing zone 62 on a real time basis. In this way, the sensors 116 and 118 monitor the $H_2/H_2O$ ratio in the blueing zone 62.

When a steam atmosphere is supplied to the blueing zone 62, a reaction creating a desired form of iron oxide $Fe_3O_4$ can be expressed as follows:

$$4H_2O+3Fe=3Fe_3O_4+4H_2 \tag{7}$$

The hydrogen $H_2$ content in the blueing zone 62 is typically low (compared to the rich hydrogen $H_2$ nitrogen-based or exothermic-based atmospheres in the annealing and cooling zones 58 and 60). As a result, the desired $H_2/H_2O$ ratio for the blueing zone 62 is typically several orders of magnitude smaller than the desired (i.e., set point) $H_2/H_2O$ ratio for either the annealing or cooling zones 58 and 60.

From Equation (7), it can be appreciated that effective control of the formation of $H_2$ in the blueing zone 62, to thereby maintain the desired low $H_2/H_2O$ ratio, can not be achieved by controlling the introduction of a steam ($H_2O$) atmosphere. From Equation (7), it can be seen that more effective control of the reaction to reduce the formation of $H_2$ can be achieved, e.g., by reducing the temperature of the blueing zone 62, to thereby slow the reaction; or by adding a gas, e.g., nitrogen $N_2$, to dilute the steam to provide less water vapor to react and form $H_2$; or by reducing the number of parts in the blueing zone 62, thereby reducing the formation of hydrogen $H_2$.

Likewise, should a higher $H_2/H_2O$ ratio be desired in the blueing zone 62, Equation (7) shows that the $H_2$ content can be increased by adding $H_2$ or a $H_2$ and nitrogen $N_2$ mixture to the blueing zone 62.

When an exothermic-based atmosphere with water vapor content is supplied to the blueing zone 62, the air-to-fuel ratio of the external generator can be controlled (as already described) to provide the desired oxidizing gas atmosphere.

It can therefore be appreciated that the ability to monitor the $H_2/H_2O$ ratio in the blueing zone with the in situ sensors 116 and 118 is advantageous, as it makes possible the direct control of the $H_2/H_2O$ ratio in the blueing zone 60.

For example, the $H_2/H_2O$ ratio output of the processing module 126 can, if desired, be conveyed to an atmosphere controller 124 for the blueing zone 62. An output 128 of the controller 124 is coupled to a suitable control mechanism 130. For a steam atmosphere, the control mechanism 130 controls the reaction expressed in Equation (7) to control the $H_2$ content in the blueing zone 62. For an exothermic-based atmosphere, the control mechanism 130 affects the air-to-fuel ratio of the external generator to control the $H_2$ content in the blueing zone 62.

A desired set point $H_2/H_2O$ ratio for the blueing zone 62 is entered into the atmosphere controller 124 by the operator through an input 132. The controller 124 includes the resident comparator function 52, already described. The desired set point $H_2/H_2O$ ratio is selected to maintain a desired oxidizing atmosphere condition at the temperature maintained in the blueing zone 62.

The controller 124 for the blueing zone 62 can therefore, if desired, operate in the same fashion as the controller 76 for the annealing zones 58. Based upon the electrical E(mv) signal from the oxygen sensor 116 and T(mv) signal from the temperature sensor 118 in the blueing zone 62, the processing module 126 derives the $H_2/H_2O$ ratio according to the resident algorithm 44. The comparator function 52 of the controller 124 compares the derived $H_2/H_2O$ ratio for the atmosphere of the blueing zone 62 to the set point, to generate a deviation. The controller 124 generates a control output to the valve 130 based upon the magnitude of the deviation, to keep the deviation at or near zero, thereby maintaining the $H_2/H_2O$ ratio in the atmosphere of the blueing zone 62 at or near the set point. An output 131 of the atmosphere controller 124 can also be coupled to the display device 134 to show various processing conditions.

In this way, the processing module 126 provides a process variable for the blueing zone 62 indicative of the low $H_2/H_2O$ ratio, based solely upon in situ sensing by the temperature sensor 118 and the oxygen sensor 116, to control the atmosphere in the blueing zone 62.

III. Graphical User Interfaces

In the illustrated embodiment (see FIG. 4), the display devices 88, 112, and 134 are consolidated to provide an interactive user interface 136. The interface 136 allows the operator to select, view, and comprehend information regarding the operating conditions within any of the zones 58, 60, or 62 of the furnace 56. The interface 136 also allows the operator to change metal heat treating conditions in one or more zones of the furnace 56.

The interface 136 includes an interface screen 138. It can also include an audio or visual device to prompt or otherwise alert the operator when a certain processing condition or conditions arise. The interface screen 138 displays information for viewing by the operator in alpha-numeric format and as graphical images. The audio device (if present) provides audible prompts either to gain the operator's attention or to acknowledge operator actions.

Figure 4:
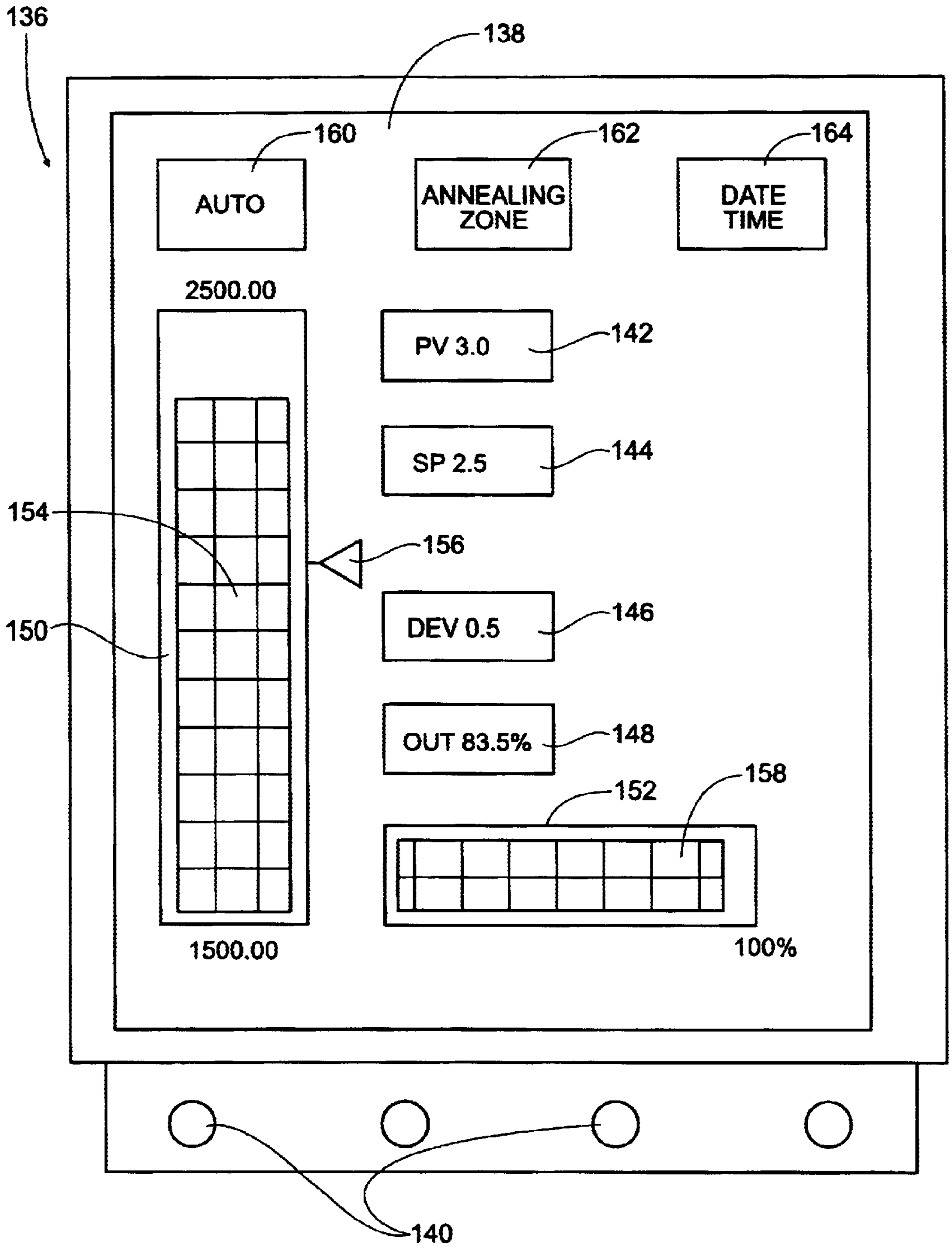
FIG. 4 is a representative screen of a graphical user interface to display information processed by the processing module for the furnace shown in FIG. 3.

The interface screen 138 can also serve as an input device, to input from the operator by conventional touch activation. Alternatively or in combination with touch activation, a mouse, or keyboard, or dedicated control buttons could be used as input devices. FIG. 4 shows various dedicated control buttons 140.

The format of the interface screen 138 and the type of alpha-numeric and graphical images displayed can vary.

A representative user interface screen 138 is shown in FIG. 4. The screen 138 includes four block fields 142, 144, 146, and 148, which contain information, formatted in alpha-numeric format. The information is based upon data received from the is associated heat and atmosphere controllers, relating to processing conditions within a given zone of the furnace 56.

The first field 142 displays in alpha-numeric format a process variable (PV), which is indicative of the $H_2/H_2O$ ratio derived by sensing from the in situ sensors residing the atmosphere of the furnace zone. The value displayed in the first field 142 comprises the $H_2/H_2O$ ratio derived by the resident algorithm 44.

The second field 144 displays in alpha-numeric format the set point value SV for the $H_2/H_2O$ ratio for the given zone. The value displayed is received as input from the operator, as previously explained.

The third field 146 displays in alpha-numeric format the deviation DEV derived by the comparator function 52 of the algorithm 44. The deviation DEV displays the difference between the process variable PV and the set point SP.

The fourth field 148 displays in alpha-numeric format the percent output (OUT), which reflects the magnitude of the control correction commanded by the PID analysis to bring the process variable PV to the set point SP. For example, when a valve controls the steam content, an OUT equal to 83.5% (as FIG. 4 shows) indicates that the valve is 83.5% open.

The screen 138 also includes two graphical block fields 150 and 152. The fields 150 and 152 provide information about the processing conditions within a given zone of the furnace 56 in a graphical format.

The first block field 150 includes a vertically oriented, scaled bar graph. A colored bar 154 graphically shows the magnitude of the process variable PV relative to the set point on the bar graph. An icon 156 marks the set point value within the scale of the bar graph.

The second block field 152 includes a horizontally oriented, bar graph scaled between 0 and 100. A colored bar 158 graphically depicts percent output (OUT), which is the magnitude of the control correction commanded by the PID analysis to bring the process variable PV to the set point SP, as before explained.

As FIG. 4 shows, the screen 138 also includes various other an alpha-numeric block fields 160, 162, and 164 displaying status information. The block field 160 identifies the mode of atmosphere control, e.g., AUTO (for automatic control by the processing module) or MAN (for manual). The block field 162 identifies the furnace zone to the displayed information pertains. The operator is able by selection of a control button 140 to select the particular zone 58, 60, or 62 for viewing information on the screen 138. The block field 164 contains date and time stamp.

By selection of another control button 140, the operator is able to change the set point for the zone 58, 60, or 62 then visible on the screen 138.

By selection of another control button 140, the operator can select among different display options for viewing information relating to the selected zone. For example, the operator can select a trend display (see FIG. 5), which graphically displays the variation over time of selected processing conditions, e.g., PV, E, and T. As another example, the operator can select a real time data display (see FIG. 6), which records instantaneous unit data values for selected processing variables, e.g., high and low measured temperatures, the highest and the current E(mv) output of the oxygen sensor, and the lowest and the current $H_2/H_2O$ ratio derived.

Due to different temperature and atmosphere conditions, the magnitudes of the $H_2/H_2O$ ratio-based values change for different processing zones. As before explained, for example, the magnitude of the $H_2/H_2O$ ratio for the blueing zone 62 can be several orders of magnitude less than the magnitude of the $H_2/H_2O$ ratio in the annealing or cooling zones 58 or 60. The considerable difference in scale of the magnitudes can lead to confusing differences in the presentation of $H_2/H_2O$ ratio-based values for the different furnace zones. To maintain consistent display proportions numerically and graphically, the processing module applies a scaling factor to the $H_2/H_2O$ ratio-based values for the blueing zone 62 for display on the screen 138. The scaling factor shifts the small absolute magnitudes of the $H_2/H_2O$ ratio-based values for the blueing zone 62 by, e.g., several orders of magnitude, for display purposes. In this way, the display of data for the blueing zone 62 has the same "look and feel" as the display of data for the annealing zone 58 or the cooling zone 60. The exponential scale factor can be displayed, e.g., as part of the real time data display (see FIG. 6).

Figure 5:
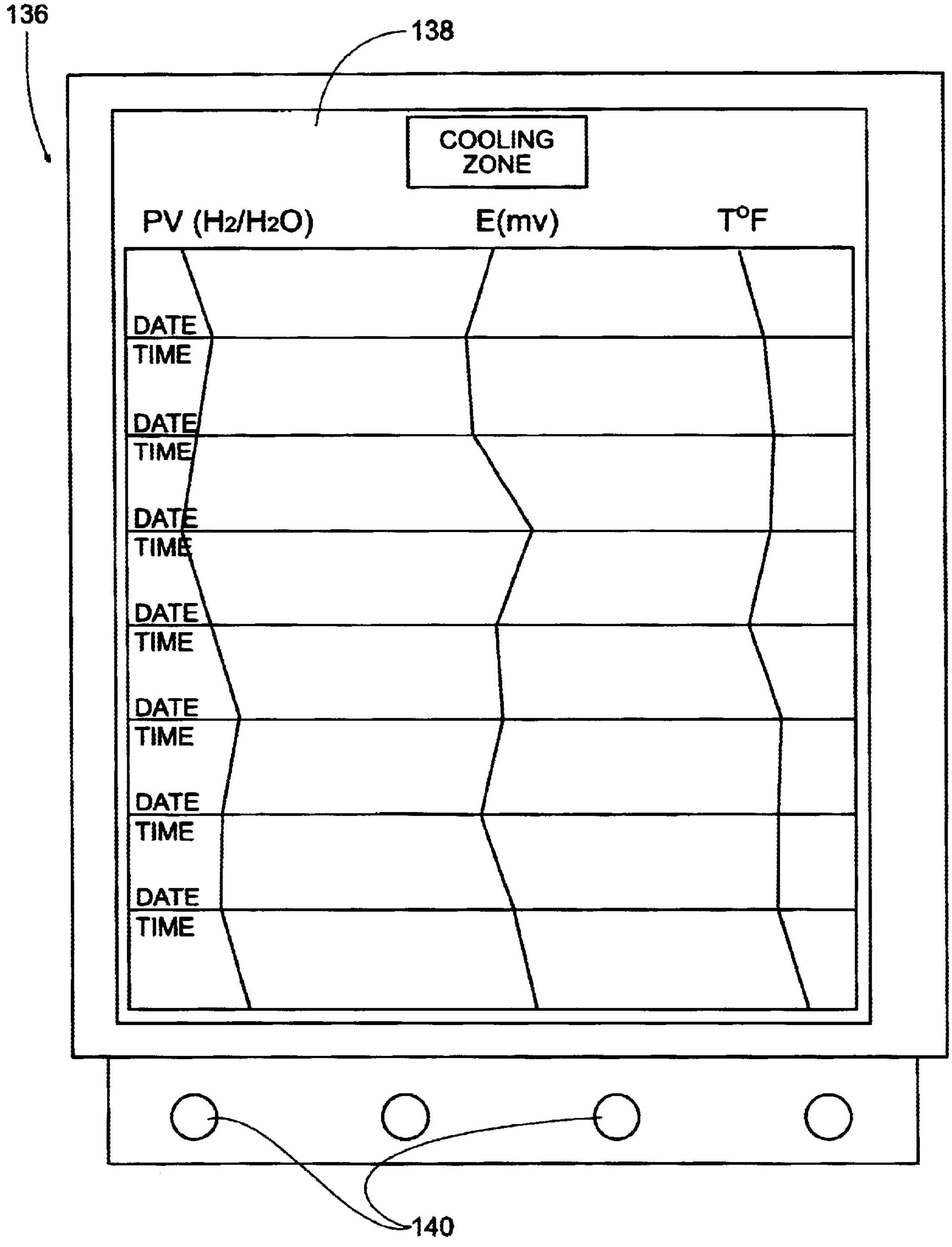
FIG. 5 is a screen of the data shown in FIG. 4, with the data recorded for a selected heat treating zone of the furnace in a trend format.
Figure 6:
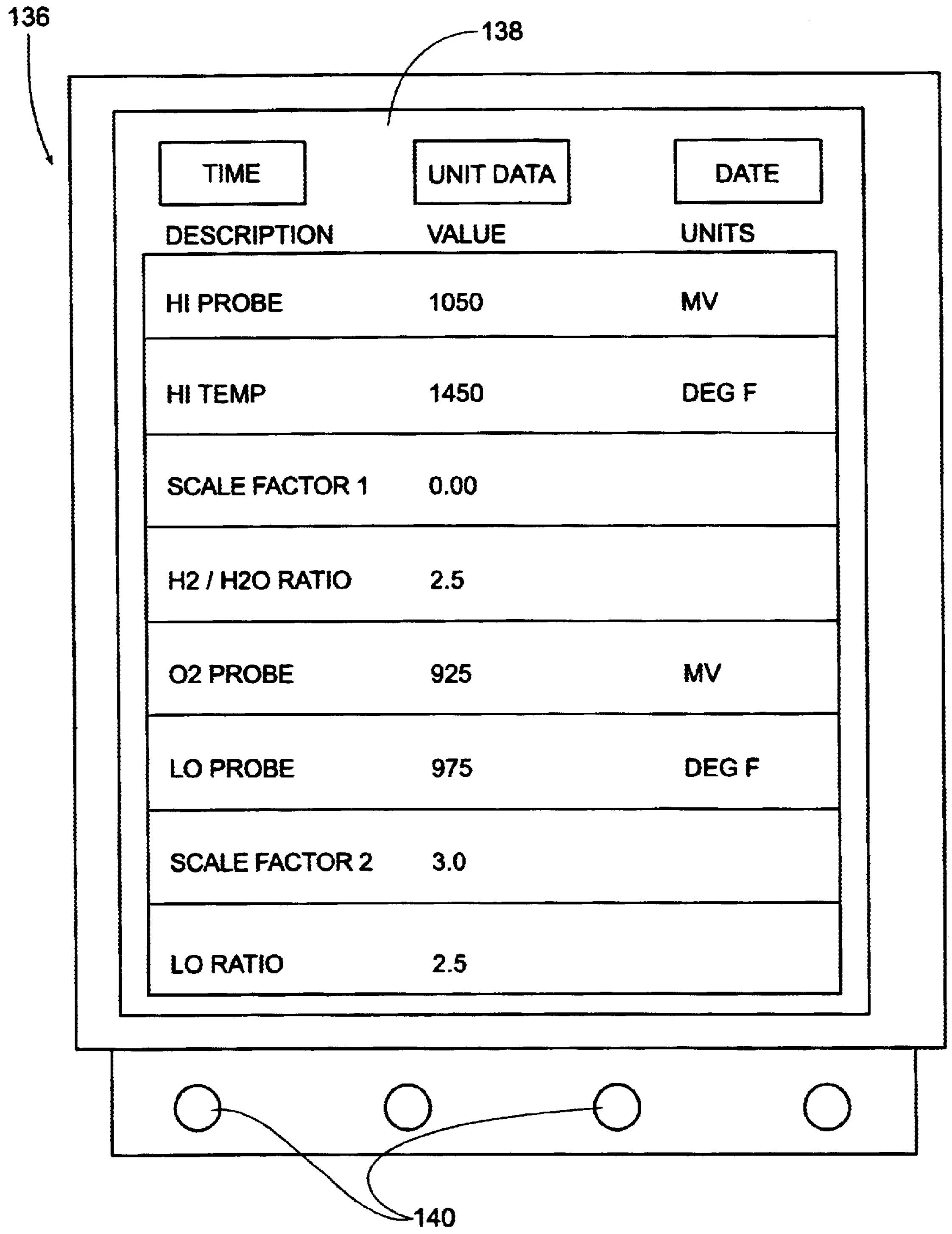
FIG. 6 is the screen of the data shown in FIG. 4, with the data displayed for a selected heat treating zone of the furnace in a unit data format.

The graphical user interface 136 shown in FIGS. 4 to 6 can be realized using a HONEYWELL™ VPR-100 Controller with standard or advanced free form math capability (Honeywell, Inc.).

The features of the invention are set forth in the following claims.

We claim:

1. A heat treating system for a solid metal part comprising:

a heat treating furnace sized and configured to receive the solid metal part, an atmosphere source comprising an exothermic generator coupled in communication with the furnace and producing an exothermic gas atmosphere containing CO, $CO_2$, $H_2$, and $H_2O$ for reaction with the solid metal part, a heat source to maintain the exothermic gas atmosphere inside the furnace at a preselected temperature, an oxygen sensor located in situ in the furnace in contact with the exothermic gas atmosphere, the oxygen sensor providing a first electrical input that varies according to an oxygen content of the exothermic gas atmosphere, a temperature sensor located in situ in the furnace in contact with the exothermic gas atmosphere, the temperature sensor providing a second electrical input that varies according to the temperature of the exothermic gas atmosphere, a processor including a processing function to generate a computed ratio of gaseous hydrogen $H_2(g)$ to water vapor $H_2O(g)$ for the exothermic gas atmosphere as a function of the first and second electrical inputs, the processor including an atmosphere control function comprising a comparator to compare the computed ratio to a set point selected to maintain a desired condition during the reaction and to generate a deviation, and an output coupled to the processor to output at least one of the computed ratio and the deviation.

2. A system according to claim 1, wherein the output is coupled to a device for displaying the computed ratio.

3. A system according to claim 1, wherein the output is coupled to a device for recording the computed ratio.

4. A system according to claim 1, wherein the output is coupled to a controller for the exothermic generator.

5. A system according to claim 4, wherein the controller adjusts an air to fuel ratio for the exothermic gas atmosphere.

6. A system according to claim 1, wherein the processing function generates the computed ratio of gaseous hydrogen $H_2(g)$ to water vapor $H_2O(g)$ according to the following expression:

$$P_{H_2}/P_{H_2O}=10^{[(10.081E-12,880.1)/(T°K)+3.2044]}$$

where:

$P_{H2}/P_{H2O}$ is the computed ratio,

T°K is the second electrical input relating to the temperature (in degrees Kelvin), and E is the first electrical input (in millivolts) that varies according to the temperature and partial pressure of oxygen of the preselected exothermic-based gas atmosphere, as follows:

$$E(mv)=0.0496T\times\log\frac{P_{O2}(Ref)}{P_{O2}}$$

where:

$P_{O2}$ (Ref) is partial pressure of oxygen in air=0.209 atm, and $P_{O2}$ is the partial pressure of oxygen in the preselected exothermic-based gas atmosphere.

7. A method for controlling a heat treating atmosphere for a solid metal part comprising the steps of:

operating an exothermic generator to produce an exothermic gas atmosphere containing CO, $CO_2$, $H_2$, and $H_2O$ for reaction with the solid metal part, deriving from at least one sensor placed in situ in the exothermic gas atmosphere a process variable indicative of the ratio of gaseous hydrogen $H_2(g)$ to water vapor $H_2O(g)$ in the exothermic gas atmosphere, comparing the process variable to a set point selected to maintain a desired condition during the reaction, deriving a deviation between the process variable and the set point, and controlling operation of the exothermic generator based, at least in part, upon the deviation.

8. A method according to claim 7, wherein the controlling step includes adjusting an air-to-fuel ratio for the exothermic gas atmosphere.

9. A method according to claim 7, further including a step of recording the process variable.

10. A method according to claim 7, further including a step of displaying the process variable.

11. A method according to claim 7, wherein the at least one sensor comprises an oxygen sensor that provides a millivolt output, and wherein the step of deriving the process variable includes deriving the ratio of gaseous hydrogen $H_2(g)$ to water vapor $H_2O(g)$ according to the following expression:

$$P_{H_2}/P_{H_2O}=10^{[(10.081E-12,880.1)/(T°K)+3.2044]}$$

where:

$P_{H2}/P_{H2O}$ is the ratio,

T°K is the temperature (in degrees Kelvin) of the preselected exothermic-based gas atmosphere, and E is the millivolt output of the oxygen sensor that varies according to the temperature and partial pressure of oxygen of the preselected exothermic-based gas atmosphere, as follows:

$$E(mv)=0.0496T\times\log\frac{P_{O2}(Ref)}{P_{O2}}$$

where:

$P_{O2}$ (Ref) is partial pressure of oxygen in air=0.209 atm, and $P_{O2}$ is the partial pressure of oxygen in the preselected exothermic-based gas atmosphere.

12. A heat treating system comprising:

a heat treating furnace, an atmosphere source comprising a preselected exothermic-based gas atmosphere containing CO, $CO_2$, $H_2$, and $H_2O$ coupled in communication with the furnace, a heat source to maintain the preselected gas atmosphere inside the furnace at a preselected temperature, an oxygen sensor located in situ in the furnace in contact with the preselected gas atmosphere, the oxygen sensor providing a first electrical input that varies according to an oxygen content of the preselected atmosphere, a temperature sensor located in situ in the furnace in contact with the preselected gas atmosphere, the temperature sensor providing a second electrical input that varies according to the temperature of the preselected atmosphere, and a processor to generate a computed ratio of gaseous hydrogen $H_2$(g) to water vapor $H_2O$ (g) for the preselected atmosphere as a function of the first and second electrical inputs according to the following expression:

$$P_{H_2}/P_{H_2O}=10^{[(10.081E-12,880.1)/(T°K)+3.2044]}$$

where:

$P_{H2}/P_{H2O}$ is the computed ratio,

T°K is the second electrical input relating to the temperature (in degrees Kelvin) of the preselected atmosphere, and E is the first electrical input that varies according to the temperature and partial pressure of oxygen of the preselected atmosphere, as follows:

$$E(mv) = 0.0496T \times \log\frac{P_{O2}(Ref)}{P_{O2}}$$

where:

$P_{O2}$ (Ref) is partial pressure of oxygen in air=0.209 atm, and $P_{O2}$ is the partial pressure of oxygen in the preselected atmosphere.

13. A system according to claim 12, and further including an output for the computed ratio.

14. A system according to claim 13, wherein the output is coupled to a device for displaying the computed ratio.

15. A system according to claim 13, wherein the output is coupled to a device for recording the computed ratio.

16. A system according to claim 13, wherein the output is coupled to a controller for the atmosphere source.

17. A system according to claim 12, wherein the processor includes a comparator to compare the computed ratio to a selected set point and generate a deviation, and further including an output for the deviation.

18. A system according to claim 17, wherein the output is coupled to a controller for the atmosphere source.

19. A system according to claim 18, wherein the controller adjusts an air to fuel ratio for the preselected gas atmosphere.

20. A method for monitoring a heat treating atmosphere containing CO, $CO_2$, $H_2$, and $H_2O$ comprising the steps of:

(i) deriving from at least one oxygen sensor placed in situ in the heat treating atmosphere a process variable indicative of the ratio of gaseous hydrogen $H_2$(g) to water vapor $H_2O$(g) in the heat treating atmosphere, the ratio being derived according to the following expression:

$$P_{H_2}/P_{H_2O}=10^{[(10.881E-12,880.1)/(T°K)+3.2044]}$$

where:

$P_{H2}/P_{H2O}$ is the ratio,

T°K is the temperature (in degrees Kelvin)of the heat treating atmosphere, and

E is the millivolt output of the oxygen sensor that varies according to the temperature and partial pressure of oxygen of the heat treating atmosphere, as follows:

$$E(mv) = 0.0496T \times \log\frac{P_{O2}(Ref)}{P_{O2}}$$

where:

$P_{O2}$ (Ref) is partial pressure of oxygen in air=0.209 atm, and $P_{O2}$ is the partial pressure of oxygen in the furnace heat treating atmosphere, and (ii) using the process variable.

21. A method according to claim 20, wherein the step (ii) includes controlling the heat treating atmosphere based, at least in part, upon the process variable.

22. A method according to claim 21, wherein the controlling step includes adjusting an air-to-fuel ratio for the heat treating atmosphere.

23. A method according to claim 20, wherein the step (ii) includes recording the process variable.

24. A method according to claim 20, wherein the step (ii) includes displaying the process variable.

25. A heat treating system comprising:

a heat treating furnace, an atmosphere source comprising a preselected exothermic-based gas atmosphere containing CO, $CO_2$, $H_2$, and $H_2O$ coupled in communication with the furnace, a heat source to maintain the preselected exothermic-based gas atmosphere inside the furnace at a preselected temperature, an oxygen sensor located in situ in the furnace in contact with the preselected exothermic-based gas atmosphere, the oxygen sensor providing a first electrical input that varies according to an oxygen content of the preselected exothermic-based gas atmosphere, a temperature sensor located in situ in the furnace in contact with the preselected exothermic-based gas atmosphere, the temperature sensor providing a second electrical input that varies according to the temperature of the preselected exothermic-based gas atmosphere, and a processor to generate a computed ratio of gaseous hydrogen $H_2$(g) to water vapor $H_2O$(g) for the preselected exothermic-based gas atmosphere as a function of the first and second electrical inputs according to the following expression:

$$P_{H_2}/P_{H_2O}=10^{[(10.081E-12,880.1)/(T°K)+3.2044]}$$

where:

$P_{H2}/P_{H2O}$ is the computed ratio,

T°K is the second electrical input relating to the temperature (in degrees Kelvin), and E is the first electrical input (in millivolts) that varies according to the temperature and partial pressure of oxygen of the preselected exothermic-based gas atmosphere, as follows:

$$E(mv) = 0.0496T \times \log\frac{P_{O2}(Ref)}{P_{O2}}$$

where:

$P_{O2}$ (Ref) is partial pressure of oxygen in air=0.209 atm, and $P_{O2}$ is the partial pressure of oxygen in the preselected exothermic-based gas atmosphere.

26. A method for monitoring a heat treating atmosphere comprising a preselected exothermic-based gas atmosphere containing CO, $CO_2$, $H_2$, and $H_2O$, the method comprising the steps of:

deriving from at least one sensor comprising an oxygen sensor that provides a millivolt output placed in situ in the preselected exothermic-based gas atmosphere a process variable indicative of the ratio of gaseous hydrogen $H_2(g)$ to water vapor $H_2O(g)$ in the prese lected exothermic-based gas atmosphere according to the following expression:

$$P_{H_2}/P_{H_2O}=10^{[(10.881E-12,880.1)/(T°K)+3.2044]}$$

where:

$P_{H2}/P_{H2O}$ is the ratio,

T°K is the temperature(in degrees Kelvin) of the preselected exothermic-based gas atmosphere, and E is the millivolt output of the oxygen sensor that varies according to the temperature and partial pressure of oxygen of the preselected exothermic-based gas atmosphere, as follows:

$$E(mv) = 0.0496T \times \log\frac{P_{O2}(Ref)}{P_{O2}}$$

where:

$P_{O2}$ (Ref) is partial pressure of oxygen in air=0.209 atm, and $P_{O2}$ is the partial pressure of oxygen in the preselected exothermic-based gas atmosphere, and using the process variable.

* * * * *